(12) United States Patent
Larsson et al.

(10) Patent No.: US 9,374,793 B2
(45) Date of Patent: Jun. 21, 2016

(54) NETWORK NODE, USER EQUIPMENT, METHODS THEREIN, COMPUTER PROGRAM PRODUCT, AND A COMPUTER STORAGE MEDIUM

(71) Applicant: Telefonaktiebolaget L M Ericsson (publ), Stockholm (SE)

(72) Inventors: Erik Larsson, Uppsala (SE); Michael Samuel Bebawy, Santa Clara, CA (US); Peter Von Wrycza, Stockholm (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/437,901

(22) PCT Filed: Nov. 1, 2013

(86) PCT No.: PCT/SE2013/051277
§ 371 (c)(1),
(2) Date: Apr. 23, 2015

(87) PCT Pub. No.: WO2014/070093
PCT Pub. Date: May 8, 2014

(65) Prior Publication Data
US 2015/0296465 A1 Oct. 15, 2015

Related U.S. Application Data

(60) Provisional application No. 61/796,095, filed on Nov. 2, 2012.

(51) Int. Cl.
*H04W 52/24* (2009.01)
*H04W 52/40* (2009.01)
(Continued)

(52) U.S. Cl.
CPC .............. *H04W 52/40* (2013.01); *H04W 36/18* (2013.01); *H04W 52/146* (2013.01);
(Continued)

(58) Field of Classification Search
CPC ..... H04W 24/00; H04W 36/18; H04W 28/22; H04W 72/14
USPC ........... 455/436, 439, 442, 522; 370/329, 331
See application file for complete search history.

(56) References Cited

U.S. PATENT DOCUMENTS

2012/0213092 A1   8/2012   Sun et al.

FOREIGN PATENT DOCUMENTS

WO    WO 2004/013987    2/2004

OTHER PUBLICATIONS

PCT Written Opinion of the International Searching Authority for International application No. PCT/SE2013/051277, Jan. 2, 2014.
(Continued)

*Primary Examiner* — Sam Bhattacharya
(74) *Attorney, Agent, or Firm* — Patent Portfolio Builders, PLLC

(57) ABSTRACT

Embodiments herein relate to a method in a network node (12,15) for managing transmit power of a user equipment (10) in a cellular network (1); wherein the network node (12,15) is comprised in the cellular network (1) and serves the user equipment (10). The network node (12,15) increases a power of a control channel of the user equipment (10). The network node (12,15) further limits a power increase of a data channel to a level by reducing a power of a serving grant of the user equipment (10) an amount, which amount corresponds to the increased power of the control channel. The network node (12,15) also reduces a reference value of the data channel for maintaining a transport block size of the data channel, which reference value determines mapping from the serving grant to the transport block size.

29 Claims, 13 Drawing Sheets

(51) Int. Cl.
- *H04W 36/18* (2009.01)
- *H04W 52/14* (2009.01)
- *H04W 52/32* (2009.01)
- *H04W 52/36* (2009.01)
- *H04W 52/26* (2009.01)
- *H04W 52/28* (2009.01)

(52) U.S. Cl.
CPC ......... *H04W 52/241* (2013.01); *H04W 52/242* (2013.01); *H04W 52/245* (2013.01); *H04W 52/325* (2013.01); *H04W 52/367* (2013.01); *H04W 52/265* (2013.01); *H04W 52/267* (2013.01); *H04W 52/286* (2013.01); *Y02B 60/50* (2013.01)

(56) References Cited

OTHER PUBLICATIONS

International Search Report for International application No. PCT/SE2013/051277, Jan. 2, 2014.

3GPP TSG-RAN WG2 Meeting #75bis; Zhuhai, China; Title: Clarification on Serving Grant to E-TFCI mapping (R2-114922), Oct. 10-14, 2011.

3GPP TSG-RAN WG1 Meeting #47bis; Sorrento, Italy; Title: Computation of E-DPDCH gain factors (R1-070177), Jan. 15-19, 2007.

3GPP TSG RAN Meeting #54; Berlin, Germany; Title: MIMO with 64QAM for HSUPA (performance) (RP-111642), Dec. 6-9, 2011.

3GPP TSG RAN Meeting #54; Berlin, Germany; Title: MIMO with 64QAM for HSUPA (HSUPA) (RP-111642), Dec. 6-9, 2011.

3GPP TSG RAN Meeting #54; Berlin, Germany Title: MIMO with 64QAM for HSUPA (core) (RP-111642), Dec. 6-9, 2011.

NETWORK NODE, USER EQUIPMENT, METHODS THEREIN, COMPUTER PROGRAM PRODUCT, AND A COMPUTER STORAGE MEDIUM

PRIORITY

This nonprovisional application is a U.S. National Stage Filing under 35 U.S.C. §371 of International Patent Application Serial No. PCT/SE2013/051277, filed Nov. 1, 2013, and entitled "Network Node, User Equipment, Methods Therein, Computer Program Product, And a Computer Storage Medium" which claims priority to U.S. Provisional Patent Application No. 61/796,095 filed Nov. 2, 2012, both of which are hereby incorporated by reference in their entirety.

TECHNICAL FIELD

Embodiments herein relate to a network node, a user equipment, methods therein, a computer program product, and a computer storage medium. In particular for managing transmit power of a user equipment in the cellular network.

BACKGROUND

In a typical cellular network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS) or base station, which in some networks may also be called, for example, a "NodeB" or "eNodeB". A cell is a geographical area where radio coverage is provided by the base station at a base station site or an antenna site in case the antenna and the base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations. The user equipment transmits data over the radio interface to the base station in Uplink (UL) transmissions and the base station transmits data over an air or radio interface to the user equipment in Downlink (DL) transmissions.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (VVCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the base stations are directly connected to the EPC core network rather than to RNCs. In general, in E-UTRAN/LTE the functions of a radio network controller are distributed between the base stations, e.g., eNodeBs in LTE, and the core network. As such, the RAN of an EPS has an essentially "flat" architecture comprising base stations without reporting to RNCs.

A cellular network typically includes some areas with high traffic, e.g., a high concentration of users. In those areas it may be desirable to deploy additional capacity to ensure user satisfaction. The added capacity may be in the form of additional macro base stations, e.g., more NodeBs in WCDMA terminology, and/or in the form of lower output power base stations. A lower output power base station covers a smaller area in order to concentrate the capacity boost in a smaller area. Examples include micro, pico, home base stations, relays, etc. Often, there are also areas with poor coverage where there is a need for coverage expansion, and one way to address these coverage issues is to deploy a lower output power base station, also called low output power node, to provide the coverage boost in a small area. A benefit with low power nodes in these situations is that their impact on the macro network is reduced, e.g., a smaller area in the macro network experiences interference.

A network deployment that uses both higher power macro nodes and low power nodes is referred to here as a heterogeneous network or "HetNet." Multiple layers in a HetNet are illustrated in the example of FIG. 1. A higher power macro base station, the high tower, provides a wide area coverage called a macro cell, and low power nodes, the shorter structures, provide small area capacity/coverage in smaller cells, dotted areas. In this example, pico base stations and pico cells, relays and relay cells, grey area, and home base stations sometimes called femto base stations and femto cells, striped areas, are shown. Although FIG. 1 shows clusters of femto cells, single femto cell deployments may also be used.

Because cells in a HetNet typically operate with different pilot power levels, there may be imbalances between the radio UL and the radio DL in the network. Cells are typically selected by UEs based on their measurements of the received signal strength of downlink transmissions from those cells, with UEs being served by the best downlink cell alternative. However, the uplink quality depends mainly on the distance between the user equipment and the serving base station site and is generally independent of the serving cell's downlink pilot power. As a result of a UE's serving cell/base station selection being based on downlink pilot signals, UEs may have a better uplink signal quality to a non-serving cell. Two examples of use cases for heterogeneous network deployment include coverage holes and capacity enhancement for localized traffic hotspots.

In WCDMA systems, a user equipment in a soft handover (SHO) is power controlled by the best uplink cell. If the cell with the best UL is a non-serving cell, one problem is how to ensure that important control information can be reliably received at the serving macro base station. The problem of weak links becomes particularly pronounced whenever the imbalance between the best UL and DL may become large, such as heterogeneous network or multi-flow operation.

SHO, also referred to as macro diversity, and fast closed-loop power control are essential features of WCDMA and Enhanced Uplink (EUL). FIG. 2 illustrates a traditional HSPA deployment scenario with two nodes having a similar transmit power level. One macro node providing a serving cell and one macro node providing a non-serving cell. Ideally, a user equipment moving from the serving cell towards the non-serving cell would enter a SHO region at point A (Event 1a), at point B (Event 1d) a serving cell change would occur, i.e. non-serving becomes serving and vice versa, and at point C (Event 1b) the user equipment would leave the SHO region. It is the radio network controller that is in control of reconfigurations, which implies rather long delays for e.g. performing a cell change. During SHO, the user equipment is power-controlled by the best uplink cell. Since the nodes have roughly the same transmit power, the optimal DL and UL handover cell borders will coincide, i.e. the path loss from the user equipment to the two nodes will be equal at point B and equal DL Rx power border is at point B. Hence, in an ideal setting and from a static, long-term fading, point of view, the serving cell would always correspond to the best uplink. However, due to practical implementation issues, e.g. reconfiguration delays, and fast fading, the user equipment might be power controlled by the non-serving cell during SHO. In such case there might be problems to receive essential control channel information in the serving cell due to the weaker link between the serving cell and UE. For example, the uplink High Speed—Dedicated Physical Control Channel (HS-DPCCH) and uplink scheduling information need to be received in the serving cell. For heterogeneous networks, other factors make the imbalance more pronounced. This may reduce the performance of the cellular network.

Possible solutions include increasing uplink gain factors using of radio resource control (RRC) signaling and sending repeated transmissions, e.g. based on Hybrid Automatic Repeat Request (HARQ) until a transmission is successfully received.

Since Low Power Nodes (LPN) and macro NodeBs in a heterogeneous network have different transmit powers, the uplink (UL) and downlink (DL) cell borders do not necessarily coincide. An example of this is when a user equipment has a smaller path loss to the LPN, while the strongest received power is from the macro NodeB. In such a scenario, the UL is better served by the LPN while the DL is provided by the serving macro NodeB. This is shown in FIG. 3. The region between the equal path loss border and equal downlink received power, e.g. (paging channel) Common Pilot Channel (CPICH) receive power from macro node denoted Power $CPICH_1$ is equal receive power from LPN denoted Power $CPICH_2$, border is referred to as imbalance region.

In this imbalance region, some fundamental problems may be encountered. For example, a user equipment in position A would have the Macro Node as the serving cell, but be power controlled towards the LPN. Due to the UL-DL imbalance the UL towards the serving macro node would be very weak, which means that important control information, such as scheduling information or HS-DPCCH, might not be reliably decoded in the serving cell but only received at the LPN. Furthermore, a user equipment in position B would have the Macro Node as the serving cell, and also be power controlled towards the macro. Due to the UL-DL imbalance, the user equipment would cause excessive interference in the LPN node. Furthermore, in this scenario we cannot fully utilize the benefits of macro offloading towards the LPN. One way of improving these problems is to utilize the available radio network controller based cell selection offset parameters, shown in FIG. 4. By tuning or adjusting a Cell Individual Offset (CIO) parameter, the handover border may be shifted towards a more optimal UL border. Similarly, the WCDMA IN_RANGE and OUT_RANGE parameters may be adjusted in order to extend the SHO region. The effect of these adjustments is illustrated in FIG. 4. The FIG. 4 illustrates how the CIO may be used to move the handover area closer to the Macro node, and that the SHO area may be extended compared to previous FIG. 3.

These adjustments are beneficial from a system performance point of view, but some difficulties remain:

Scenario 1—A user equipment in position A may experience a poor DL from the non-serving LPN. This may complicate a reliable detection of UL related DL channels, e.g. E-DCH-HARQ Indicator Channel (E-HICH) and Fractional Dedicated Physical Channel (F-DPCH) from the LPN. E-DCH stands for Enhanced Dedicated Channel.

Scenario 2—A user equipment in position B has the macro cell as serving cell but is, in general, power controlled towards the LPN. Hence, the uplink signal towards the serving cell might be weak and thereby complicate a reliable reception of control channel information at the serving cell.

Scenario 3—A user equipment in position C is served by the LPN. However, its DL might be poor and thereby complicate a reliable reception of control information, such as High Speed Shared Control Channel (HS-SCCH) and E-DCH absolute grant channel (E-AGCH).

Scenario 4—A user equipment in position D might experience a poor UL towards the non-serving macro cell and thereby complicate the uplink reception at the macro cell.

To maximize the potential gains provided by range extension, the problems associated with the different scenarios above need to be solved. Thus, there is a need to both optimize the system performance and improve the link quality for UEs experiencing significant degradation in the UL or DL. In addition, there is a need to provide reliable reception of UL control information, while at the same time minimizing interference from one or more data channels, e.g. the Enhanced Dedicated Channel Dedicated Physical Data Channel (E-DPDCH), when the UL communication link, e.g. the E-DPCCH, is weak to avoid a reduced performance of the cellular network.

SUMMARY

An object of embodiments herein is to provide a mechanism that improves the performance of the cellular network.

The object is achieved by an embodiment providing a method in a network node for managing transmit power of a user equipment in a cellular network. The network node is comprised in the cellular network and serves the user equipment. The network node increases a power of a control channel of the user equipment, and limits a power increase of a data channel to a level by reducing a power of a serving grant of the user equipment an amount, which amount corresponds to the increased power of the control channel. The network node then reduces a reference value of the data channel for maintaining a transport block size of the data channel, which reference value determines a mapping from the serving grant to the transport block size.

The object is also achieved by an embodiment providing a method in a network node for managing transmit power of a user equipment in a cellular network. The network node is comprised in the cellular network and serves the user equipment. The network node increases a power of a control channel of the user equipment, and limits a power increase of a data channel to a level by reducing a power of a serving grant of the user equipment an amount, which amount corresponds to the increased power of the control channel. The network node then reduces a reference value of the data channel for maintaining a transport block size of the data channel, which reference value determines a mapping from the serving grant to the transport block size.

By increasing the power of the control channel, reducing the power of the serving grant, and maintaining the transport block size of the data channel, control information will be received without increasing interference and reducing in amount of data, leading to an improved performance of the cellular network.

The object is also achieved by embodiments providing a network node for managing transmit power of the user equipment in the cellular network. The network node is configured to serve the user equipment. The network node being configured to increase a power of a control channel of the user equipment; to limit a power increase of a data channel to a level by reducing a power of a serving grant of the user equipment an amount, which amount corresponds to the increased power of the control channel; and to reduce a reference value of the data channel for maintaining a transport block size of the data channel, which reference value determines a mapping from the serving grant to the transport block size.

The object is further achieved by embodiments providing a user equipment for managing transmit power of the user equipment in the cellular network. The cellular network comprises a network node serving the user equipment. The user equipment is configured to: increase a power of a control channel of the user equipment; limit a power increase of a data channel to a level by reducing a power of a serving grant of the user equipment an amount, which amount corresponds to the increased power of the control channel; and to reduce a reference value of the data channel for maintaining a transport block size of the data channel, which reference value determines a mapping from the serving grant to the transport block size.

Embodiments herein also disclose a computer program product, comprising instructions which, when executed on at least one processor, cause the at least one processor to carry out the methods described herein. Furthermore, a computer-readable storage medium, having stored thereon the computer program product is disclosed herein.

BRIEF DESCRIPTION OF THE DRAWINGS

Embodiments will now be described in more detail in relation to the enclosed drawings, in which.

DETAILED DESCRIPTION

Figure 1:
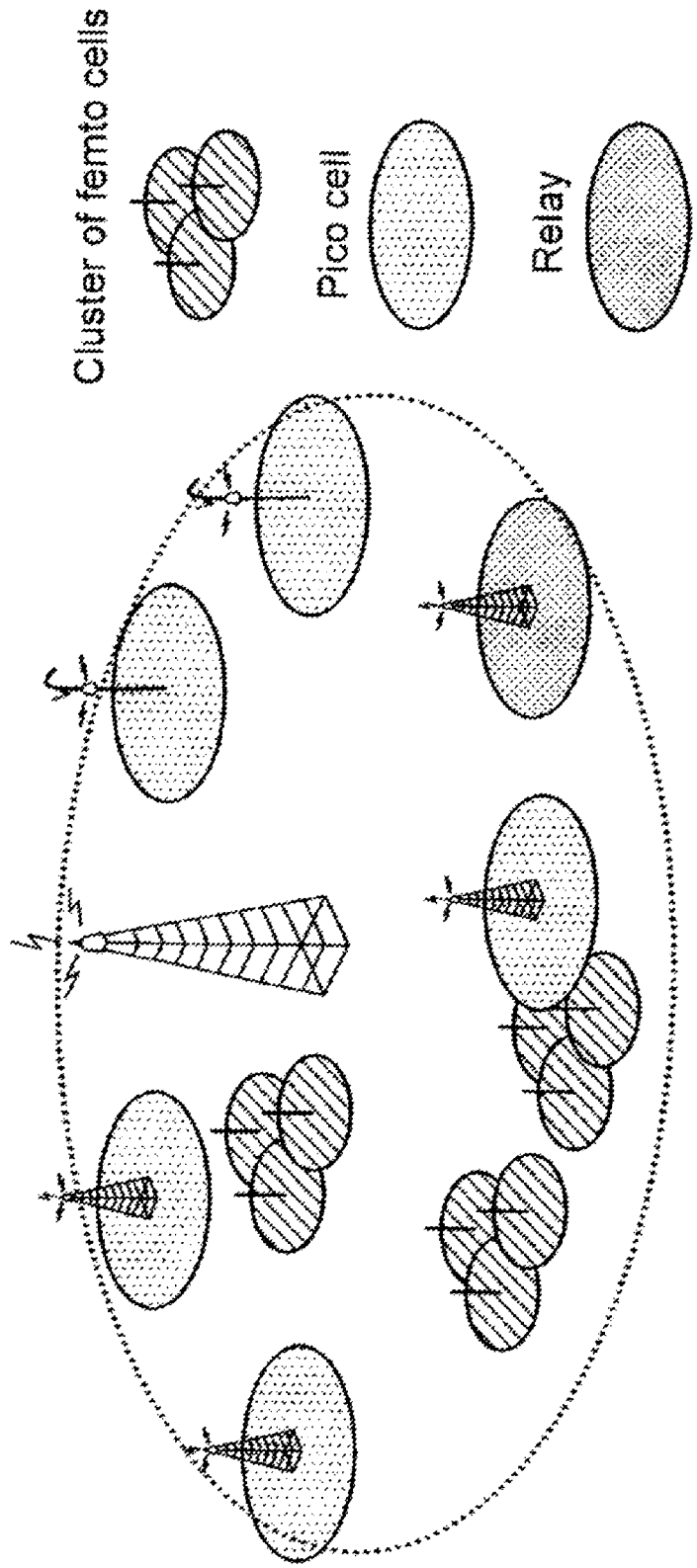
FIG. 1 is a schematic overview depicting a HetNet.
Figure 2:
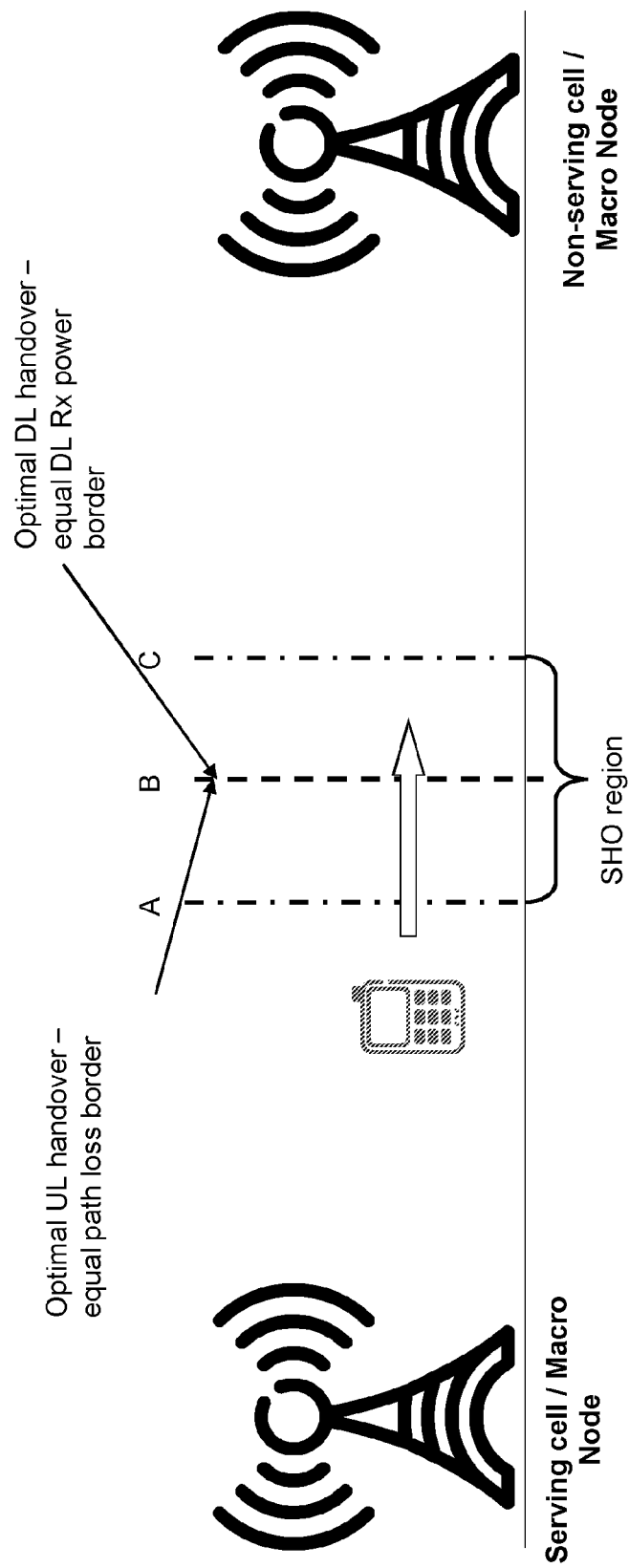
FIG. 2 is a schematic overview depicting a handover scenario.
Figure 3:
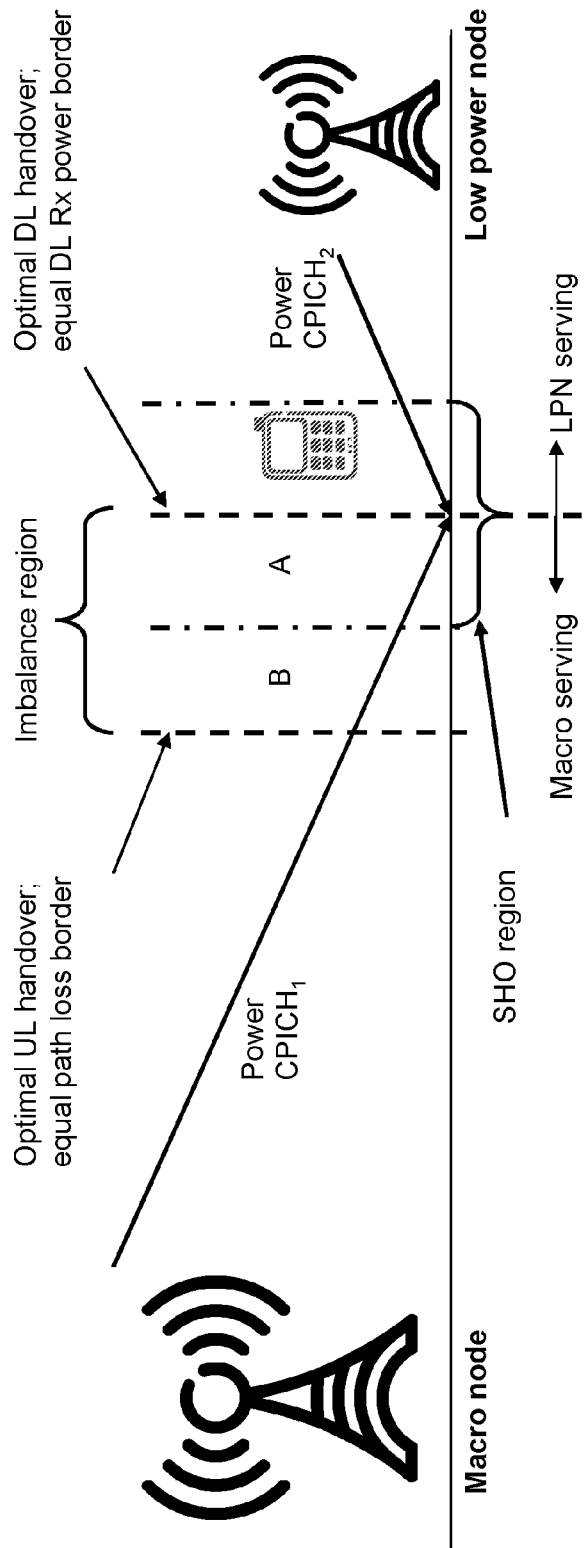
FIG. 3 is a schematic overview depicting a handover scenario.
Figure 4:
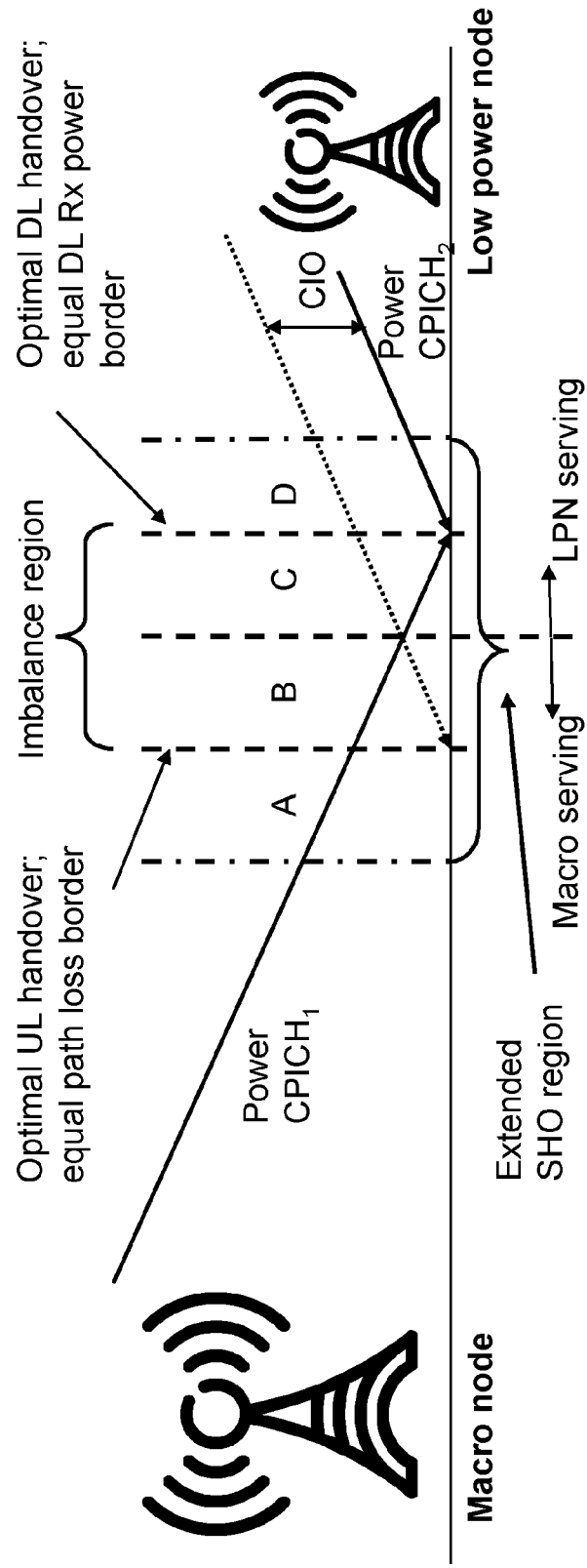
FIG. 4 is a schematic overview depicting a handover scenario.
Figure 5:
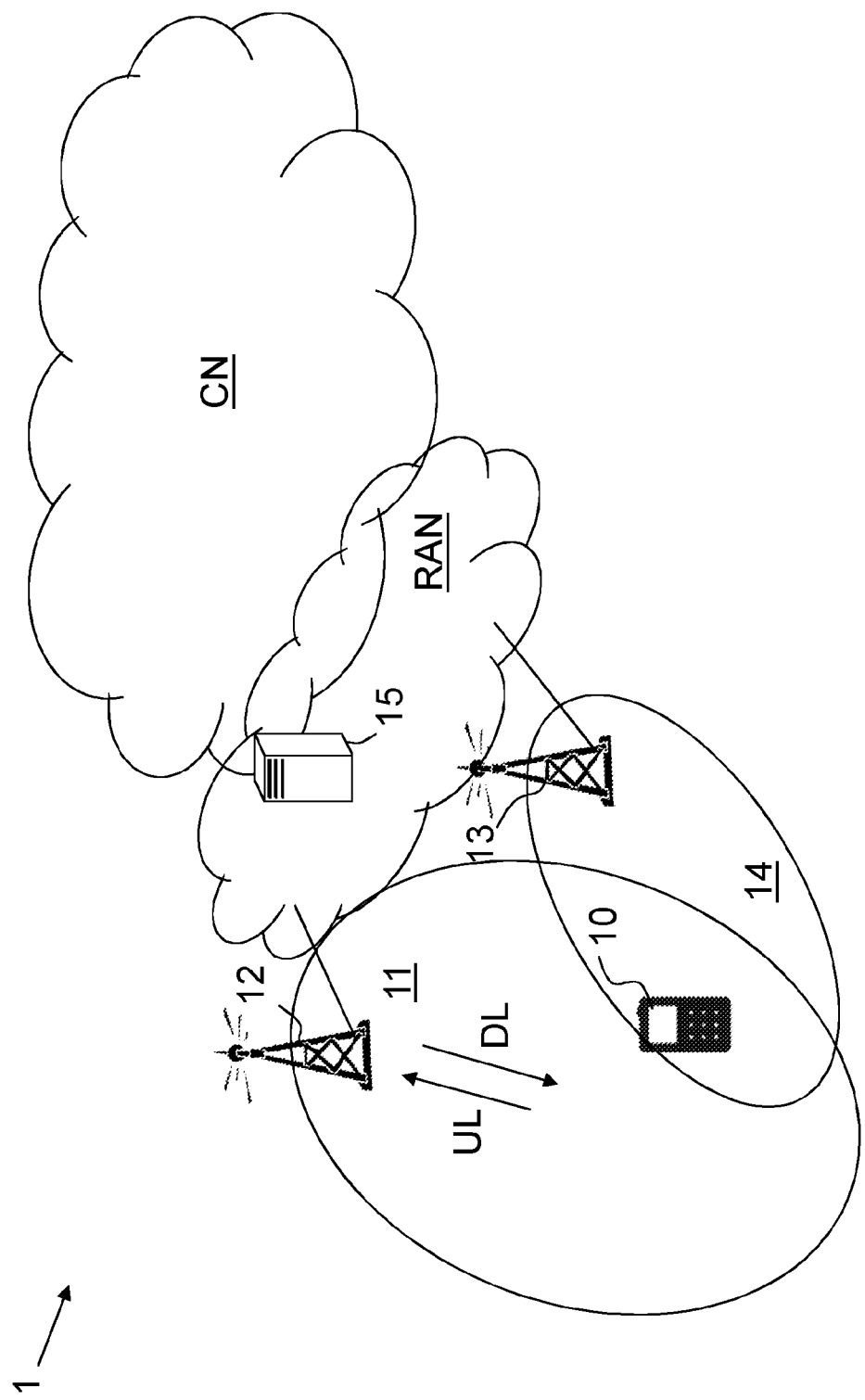
FIG. 5 is a schematic overview depicting a cellular network according to embodiments herein.

The technology relates to radio communications, and in particular, to uplink communications in heterogeneous wireless networks. Embodiments herein relate to cellular networks, also referred to as radio communications networks or similar. FIG. 5 is a schematic overview depicting a cellular network 1. The cellular network 1 comprises one or more RANs and one or more CNs. The cellular network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The cellular network 1 is exemplified herein as a WCDMA network.

In the cellular network 1, a user equipment 10, also known as a mobile station, and/or a wireless terminal, communicates via a RAN to one or more core networks (CN). It should be understood by the skilled in the art that "user equipment" is a non-limiting term which means any wireless terminal, wireless device, Machine Type Communication (MTC) device, a Device to Device (D2D) terminal, or node e.g. smartphone, laptop, mobile, sensor, relay, mobile tablets or even a small base station communicating within respective cell.

The cellular network 1 covers a geographical area which is divided into cell areas, e.g. a cell 11 being served by a network node, such as a base station 12. The base station 12 may also be referred to as a first base station or radio base station and e.g. a NodeB, an evolved Node B (eNB, eNode B), a base transceiver station, Access Point Base Station, base station router, or any other network unit capable of communicating with a user equipment within the cell served by the base station 12 depending e.g. on the radio access technology and terminology used. The base station 12 may serve one or more cells, such as the cell 11.

A cell is a geographical area where radio coverage is provided by base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole cellular network 1 is also broadcasted in the cell 11. The base station 12 communicates over an air or radio interface operating on radio frequencies with the user equipment 10 within range of the base station 12. The user equipment 10 transmits data over the radio interface to the base station 12 in Uplink (UL) transmissions and the base station 12 transmits data over the air or radio interface to the user equipment 10 in Downlink (DL) transmissions.

The network node serving the user equipment 10 may be referred to as a first network node. A second network node such as a second base station 13 may provide radio coverage over a second area, a second cell 14. The second base station 13 may be a low power (radio) node providing a pico cell or similar, whereas the base station 12 may be a macro base station, providing radio coverage over a bigger area provided by a larger transmit power. The base station 12 and second base station 13 may be connected, e.g., by landlines or microwave, to a controller node, e.g. a radio network controller (RNC) 15 or a base station controller (BSC), which supervises and coordinates various activities of the plural base stations connected thereto. The radio network controller 15 is typically connected to one or more core networks. The radio network controller 15 is also an example of a network node.

Embodiments herein address scenarios where the user equipment 10 is connected to several nodes, such as the base station 12 and the second base station 13, with different link quality, and important control information needs to be received, by the user equipment 10 or the base station 12, over a potentially weak link. For example, in a WCDMA system, the user equipment 10 in soft handover (SHO) is power-controlled by the best uplink cell. If the best UL is a non-serving cell, e.g. the second base station 13, one problem is how to ensure that important control information may be reliably received at a serving base station, i.e. the base station 12. The problem of weak links becomes particularly pronounced whenever the imbalance between the best UL and DL may become large, such as for heterogeneous networks or multi-flow operation.

Embodiments herein propose a method for ensuring reliable reception of UL control information when the communication link is weak, e.g. to shift the Signal to Noise Ratio (SNR) operating point or Signal to Interference Ratio (SIR) target when important control information is transmitted during periods of a potentially weak communication link.

For a stable and well-performing network it is necessary that important UL control information can be received. Examples of such information are DL-related acknowledgment/non-acknowledgement (ACK/NACK) information carried on the HS-DPCCH and EUL control information carried on the E-DCH-DPCCH, (E-DPCCH) and in-band scheduling information conveyed via the E-DPDCH.

One approach is to increase the SIR target typically set by the radio network controller 15 and used in traditional "inner loop" user equipment transmit power control between the base station 12 and the user equipment 10. A sufficiently SIR target during SHO with links of different quality means that all the power levels of transmission on all UL channels are booted. Although this may result in better reception at the base station 12, it also means that transmission onto some UL channels are at excessive power levels leading to increased interference, especially in the LPN, exemplified as the second base station 13.

Consider a SHO scenario where the user equipment 10 has the macro base station, being an example of the first base station 12, as its current serving cell 11, the user equipment 10 is power controlled by a LPN, being an example of the second base station 13, because the user equipment 10 has a stronger UL to the LPN than to the macro base station. Increasing the inner loop power control SIR target effectively also increases the power transmitted on the E-DPDCH, which in normal conditions means that an excessively high signal reception quality is achieved leading ultimately to a decreased in the SIR target. Preventing this SIR target decrease means increased interference in the LPN. A better approach is to ensure that the power transmitted on one or more data channels, e.g. the E-DPDCH, is not necessarily increased simply because the SIR target is increased to obtain better reception of control information on one or more uplink control channels, e.g. on the E-DPCCH. In this way, the increased SIR target provides more reliable reception on UL channels while at the same time the excessive interference in the LPN is avoided by not increasing or at least limiting an increase in the transmit power over one or more other channels like one or more UL data channels.

Figure 6:
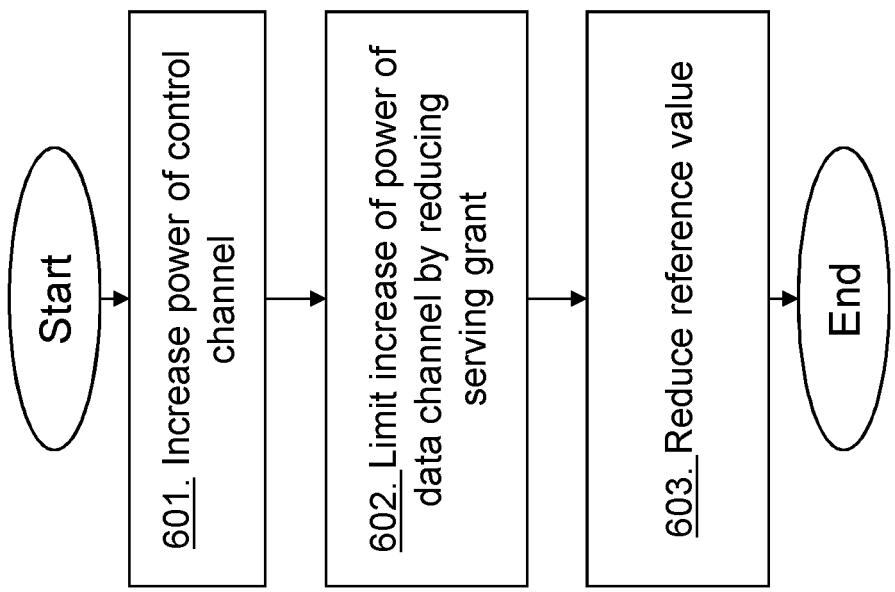
FIG. 6 is a flowchart depicting a method in a network node according to embodiments herein.

The method actions in the network node, referred to as the base station 12 or radio network controller 15 in the figures, for managing transmit power of the user equipment 10 in the cellular network 1 according to some embodiments will now be described with reference to a flowchart depicted in FIG. 6. The network node is comprised in the cellular network 1 and serves the user equipment 10. The actions do not have to be taken in the order stated below, but may be taken in any suitable order. The control channel may be an uplink control channel and the data channel may be an uplink data channel.

Action 601. The network node increases a power of a control channel of the user equipment 10. In some embodiments the network node increases the SIR target at the radio network controller 15, to increase the power of the control channel. By doing this the control data from the user equipment 10 will be received at e.g. the base station 12.

Action 602. The network node limits a power increase of a data channel to a level by reducing a power of a serving grant of the user equipment 10 an amount. The amount corresponds to the increased power of the control channel. The network node may reduce a gain factor to be used the data channel to reduce the power of the serving grant. The network node may maintain the power of the data channel. By doing this the interference towards the second base station 13 is not increased. Reducing the serving grant means that the maximum avowed data transmit power is reduced, i.e. the maximum gain factor that can be used for data channel, e.g. E-DPDCH, is reduced. The reduction in serving grant may be network triggered, using existing functionality, i.e. E-AGCH or Enhanced Relative Grant Channel (E-RGCH), but can also be handled by the user equipment 10 when configured/ordered to.

Action 603. The network node reduces a reference value of the data channel for maintaining a transport block size of the data channel, which reference value determines mapping from the serving grant to the transport block size. By doing this the amount data is kept at the same level as before leading to no reduced performance of a transmission. The reference value may be an amplitude reference value of the E-DPDCH. The reference value may be transmitted to the user equipment 10. Furthermore, the network node may indicate, to the user equipment 10, a set of reference values to use out of several sets of reference values or an offset of a reference value, current reference value, to use. The transmitting may be done using Radio Link Control (RLC) or via dynamic L1 signaling, e.g. HS-SCCH orders. The network node may additional or alternatively use a negative DeltaHARQ value to reduce the reference value.

The method may be performed when at least one of the following occurs: entering soft handover; entering soft handover between network nodes of different transmit power capability; a quality of the control channel goes below a threshold value; a quality of the data channel is below a target; receiving, from the user equipment 10, an indication of too many retransmissions from the base station 12 serving the user equipment 10; and receiving uplink signal quality of a certain level.

Figure 7:
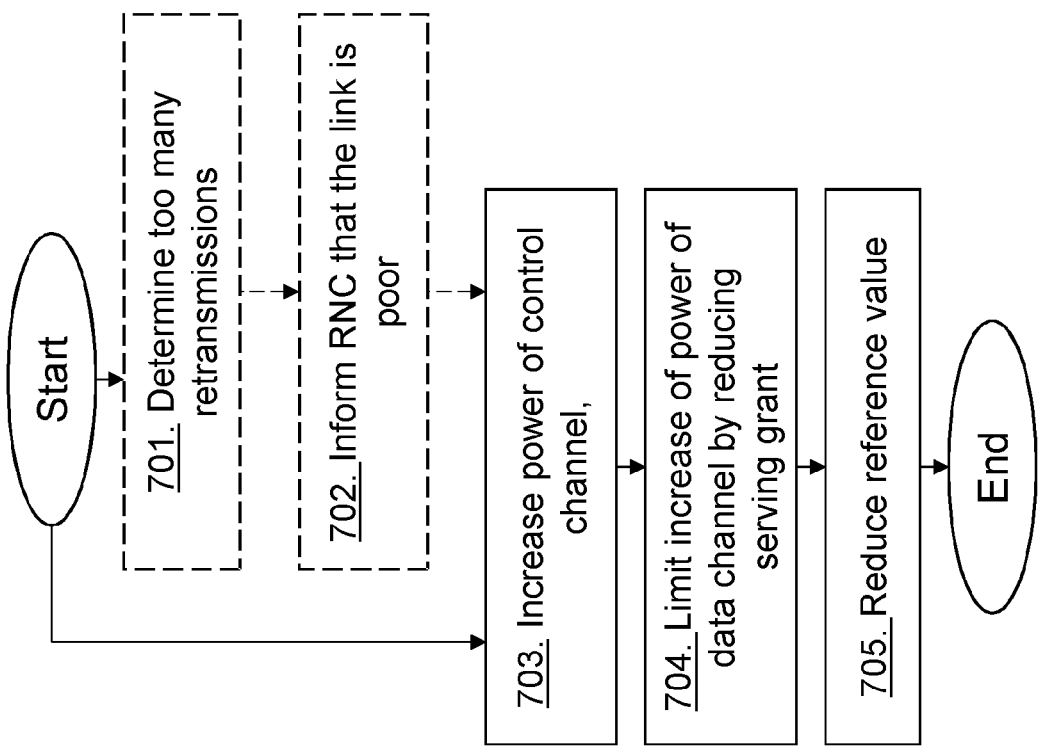
FIG. 7 is a flowchart depicting a method in a user equipment according to embodiments herein.

The method actions in the user equipment 10 for managing transmit power of the user equipment 10 in the cellular network 1 according to some embodiments will now be described with reference to a flowchart depicted in FIG. 7. The cellular network 1 comprises the network node serving the user equipment 10. The actions do not have to be taken in the order stated below, but may be taken in any suitable order. Actions performed in some embodiments are marked with dashed boxes.

Action 701. The user equipment 10 may determine that the base station 12 serving the user equipment 10 performs too many retransmissions.

Action 702. The user equipment 10 may then transmit information, to the radio network controller 15, that a link towards the base station 12 is poor based on the determination.

Action 703. The user equipment 10 increases the power of the control channel of the user equipment 10.

Action 704. The user equipment 10 limits the power increase of the data channel to a level by reducing a power of a serving grant of the user equipment 10 an amount. The amount corresponds to the increased power of the control channel.

Action 705. The user equipment 10 reduces the reference value of the data channel for maintaining a transport block size of the data channel, which reference value determines a mapping from the serving grant to the transport block size. The reference value may be reduced by using a negative DeltaHARQ value towards the network node. The user equipment 10 may comprise several sets of reference values, and may receive, from the network node, an indication indicating which set out of the several sets to use.

For example, the user equipment 10 may receive the reduced reference value from the network node, and use the received reference value, e.g. the user equipment 10 may receive an offset. This results in the increasing of the power of the control channel and the limiting of the power of the data channel. As an alternative, the user equipment 10 may receive, from the network node, a serving grant value, a reference value, and/or an order to reduce the transmit power of the control channel; and may use the received serving grant value to reduce the serving grant, and the received reference value to reduce the reference value.

The SIR target increase and data channel power control functionality may be UE-triggered. For example, the user equipment 10 may determine that the serving cell (or any cell) is performing too many retransmissions and deduce that the link towards that cell node is poor. The user equipment 10 informs the radio network controller 15 about this, and the radio network controller 15 may then command the user equipment 10 to configure the power control mechanism and preferably informs the base station 12 that the power control mechanism is employed.

There are two ways of operating the embodiments herein, implicit or explicit: The explicit approach is where all (or more than one) of the actions 601-603 or 702-705 are explicitly triggered. For example, the network will "simultaneously" increase the SIR target, issue a new serving grant and new reference values. It may e.g. be a scenario where the user equipment 10 increases its control channel power, e.g. DPCCH, directly by x dB, i.e. without using the traditional inner-loop power control mechanism that typically increase in steps of 1 dB.

The implicit approach is where the network node only signals new reference values, and existing system mechanisms will ensure that the SIR target is increased, and the grant is decreased.

The uplink signal quality to a particular base station, e.g. the base station 12, may also be sent to the radio network controller 15, the serving node, or all other nodes involved in the SHO. Communications may take place using a fast backhaul or via the radio network controller 15. From this information the radio network controller 15, or the serving base station 12 determines whether the SIR target increase and data channel power control is needed.

Similar or inverted criteria may be used for when to stop using the SIR target increase and data channel power control.

Figure 8:
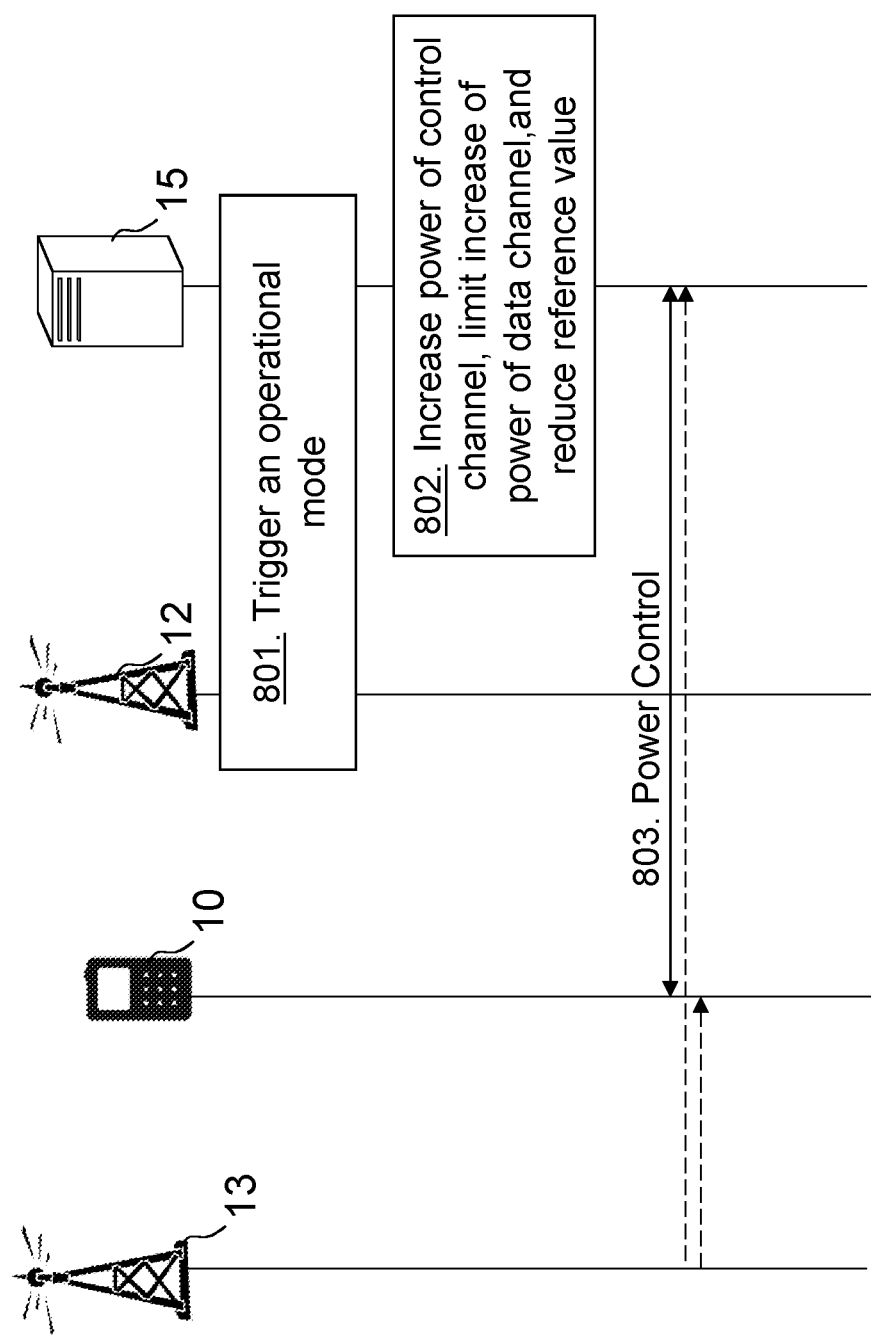
FIG. 8 is a schematic combined flowchart and signaling scheme depicting embodiments herein.

FIG. 8 is a combined flowchart and signaling scheme depicting embodiments herein.

Action 801. The base station 12 and the radio network controller 15 may detect a condition triggering the mechanism disclosed herein. E.g. radio network controller 15 detects that the user equipment 10 enters a SHO.

Action 802. The radio network controller 15 increases the transmit power of the control channel from the user equipment 10, leading to that data will be transmitted and received at the user equipment 10. The radio network controller 15 limits a power increase of the data channel to a level by reducing a power of a serving grant of the user equipment 10 an amount. The amount corresponds to the increased power of the control channel. The radio network controller 15 then reduces a reference value of the data channel for maintaining a transport block size of the data channel. The reference value determines mapping from the serving grant to the transport block size. This corresponds to actions 601-603 above. In one example embodiment, the transmit power level for all control channels (DPCCH, E-DPCCH, HS-DPCCH) is increased while keeping the data power (for E-DPDCH) at a fixed level. This means that the robustness/quality of essential control channels is increased while maintaining E-DPDCH power. Power includes other parameters that depend on power such as but not limited to transport block size (TBS), quality, data rate, interference, etc. The increased power for the control channels is achieved by increasing the inner power control loop SIR target, and at the same time, the reference amplitude values for E_DPDCH are increased. In other words, the DPCCH SIR operating point is increased which increases the DPCCH power, and a more aggressive E-DPDCH reference value setting is used to maintain the E-DPDCH power.

One example implementation is now described for this embodiment. A first action, action 601, may e.g. be to increase the DPCCH SIR target. The DPCCH transmit power level is dictated by the inner loop power control SIR target which is controlled by the outer loop power control (OLPC), e.g. at the radio network controller 15. Hence, to increase the DPCCH power, a larger SIR target may be used. Various techniques may be used to ensure that a certain SIR target is achieved. Non-limiting examples include a configurable minimum SIR target which one or more node can affect, freezing the SIR target during certain periods, i.e. not allowing the OLPC to decrease the SIR target or simply disabling the OLPC, boosting the DPCCH transmit power etc.

A second action is to decrease the serving grant. This reduction of the serving grant may either be performed by the user equipment 10 or by the network using, e.g. a new serving grant via the E-DCH Absolute Grant Channel (E-AGCH), see action 602 or action 704. One benefit with the network, i.e. the network node exemplified as the radio network controller 15, handling this operation is that the network has better knowledge of how much the SIR target is increased. For example, the user equipment 10 may have to estimate the DPCCH increase or rely on signaled information from the network.

A third action is to decrease the reference value e.g. the E-DPDCH reference amplitude values ($A_{ed}$), see action 603 or action 705. The total E-DPDCH power remains roughly the same before and after the two actions above, which is one desired objective. This means that the same power level, e.g. TBS, may be used before and after the two actions. Because the power remains fixed the receiver can support the same TBS. However, since the serving grant was decreased in the second action above, less data (a smaller TBS) is transmitted unless some other action is taken. One example of the third action is to decrease the E-DPDCH reference amplitude values ($A_{ed, ref}$). The reference amplitude values being reference values determine the mapping from serving grant to TBS, and by decreasing these reference amplitude values, a more aggressive mapping is used. The total decrease in reference amplitude values (sum of all squared $A_{ed}$) corresponds to the decrease of the serving grant.

Other factors may be considered. First, instead of aiming at keeping the E-DPDCH power constant, another embodiment aims at a fixed Rise-over-thermal (RoT). Second, the user equipment 10 and all nodes in the active set need to have a consistent view of which E-DPDCH reference values that are used. So a change of these values preferably robustly signaled, for example, via higher layer signaling or HS-SCCH orders. See further details are provided below. Another possibility is to allocate several sets of E-DPDCH reference values at setup, and indicate which of the sets to use. The (quantized) amplitude ratios $A_{ed}$ are determined from $\Delta_{E\text{-}DPDCH}$ which is a signaled value, and the meaning is defined in Section 4.2.1.3 of 25.213 v.11.3.0, and may be signaled by higher protocol layers. The translation of $\Delta_{E\text{-}DPDCH}$ into quantized amplitude ratios $\Delta_{ed}=\beta_{ed}/\beta_c$ is specified in 25.213 section 4.2.1.3 version 11.3.0. To change the reference values, a whole set of $A_{ed}$ reference values (or $\Delta_{E\text{-}DPDCH}$) may be signaled, or one or several offsets may be signaled, e.g. let $A_{ed,modified}=A_{ed,offset}$, or $\Delta_{E\text{-}DPDCH,modified}=\Delta_{E\text{-}DPDCH}/\text{offset}$, where the division may instead be implemented using multiplication.

Third, a similar reference value change may be achieved by using existing DeltaHARQ mechanism by configuring DeltaHARQ in the scenarios discussed above, and allowing a negative DeltaHARQ value, which produces a similar result as with decreasing $A_{ed}$ described above.

Action 803. The radio network controller 15 then uses the modified values to power control the user equipment 10, such as in an OLPC, via the base station 12 or via the second base station 13.

Embodiments herein ensure reliable reception of UL control information when the UL communication link is weak. A SNR operating point or target is selectively adjusted, e.g. increased, when control information is transmitted during periods of a potentially weak uplink communication link carrying the control information. As a result, the transmit power on one or more uplink control channels is effectively boosted, improving uplink reception. At the same time, data channel power is maintained to avoid unnecessary power increase, increased interference, and reduced performance. More generally, the selectivity of this approach may also be applied to downlink communications and is not limited to control and data channels. Indeed, the power control selectivity may be applied so that the adjustment of an SNR target may be for the benefit of one type of channel or information being poorly received and the transmit power maintenance may be applied to other channels or information being satisfactorily received.

Figure 9:
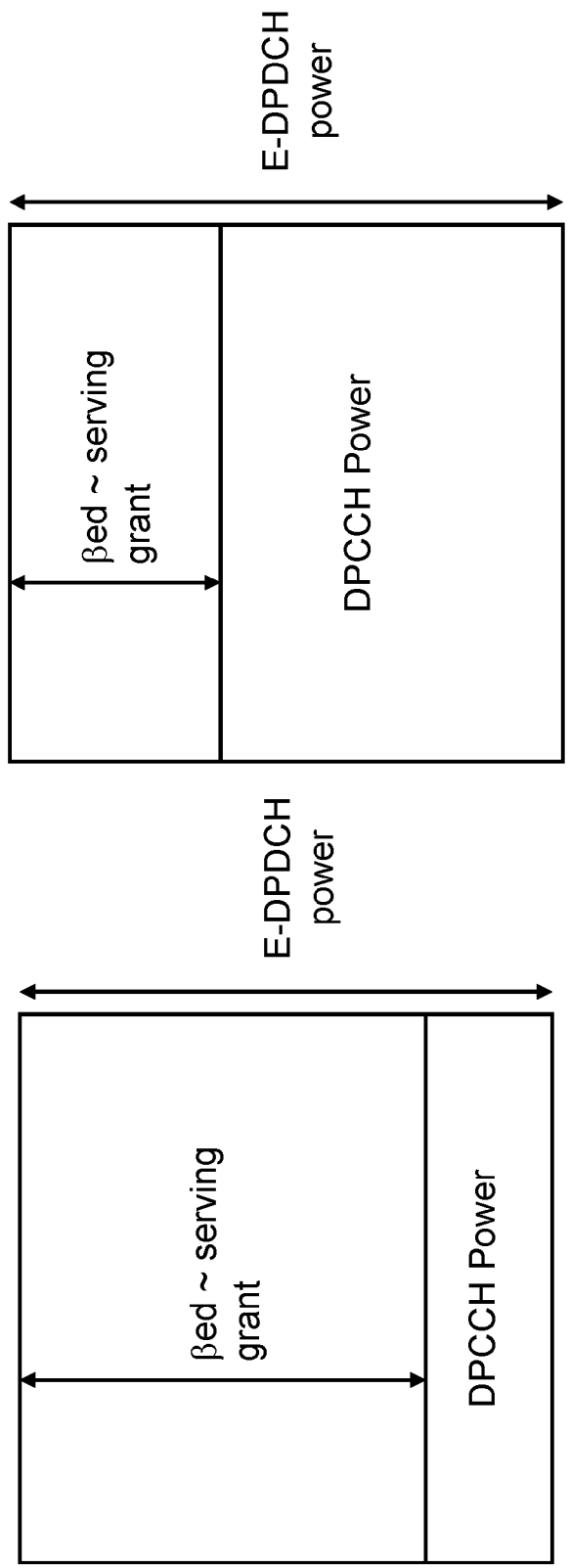
FIG. 9 is a block diagram depicting power distribution according to embodiments herein.

FIG. 9 shows examples of the E-DPDCH power, defined along a horizontal axis, given different SNR/reference value settings. The E-DPDCH power is set relative to the DPCCH power by the E-DPDCH gain factors ($\beta_{ed}$). Hence, if the E-DPDCH power is to remain fixed even though the DPCCH power is increased, then the E-DPDCH gain factors ($\beta_{ed}$) need to be reduced. Under normal conditions (not power/buffer limited), the E-DPDCH gain factors ($\beta_{ed}$) are determined by the serving grant. Accordingly, the serving grant is reduced by an amount corresponding to the DPCCH power increase resulting from the increased SIR target. Furthermore, in order to maintain the QoS of the cellular network 1 the reduced reference value keeps the TBS Hence, embodiments herein limit the power of the data channel by using an updated or reduced grant value, and maintain an E-DPDCH QoS (TBS) by using the received reference value.

The transmit power level boosting of one or more control channels (DPCCH, E-DPCCH, HS-DPCCH), while keeping the data (E-DPDCH) power at or about the same level before the boost may be managed in the various ways. Non-limiting examples are provided below. Combinations of these examples may be used as well.

On way to manage the transmit power level increase of one or more control channels is to allow the network (e.g. base station 12 and/or radio network controller 15) to control it. This may be done in a semi-statically (e.g. using higher layer signaling) or dynamically (e.g. using HS-SCCH orders) manner. Embodiments herein, also referred to as a controlling network functionality, then determine, but is not limited to determining:

when to trigger/release the SIR target increase and a data channel power control;

how the SIR target increase and data channel power control should be operated, e.g. continuously, periodically, using a pre-defined pattern or when important information is conveyed; and timer setting related to the SIR target increase and data channel power control.

One or more non-limiting example criteria for when to enable the power control include:

when enabled by higher protocol layers or HS-SCCH orders.

when entering soft handover or when entering soft handover involving nodes of different transmit powers (potentially a large imbalance between UL and DL)

When the quality of control channel, e.g. HS-DPCCH or E-DPDCH, decreases below a threshold. Similarly, the quality of the E-DPDCH may be used as a trigger. For example, if the serving node continuously fails to decode data it is an indication that the link is poor. Also, if the estimated SIR is below the SIR target for some time, it is an indication that another node is handling the power control and that its own uplink may be weak.

Figure 10:
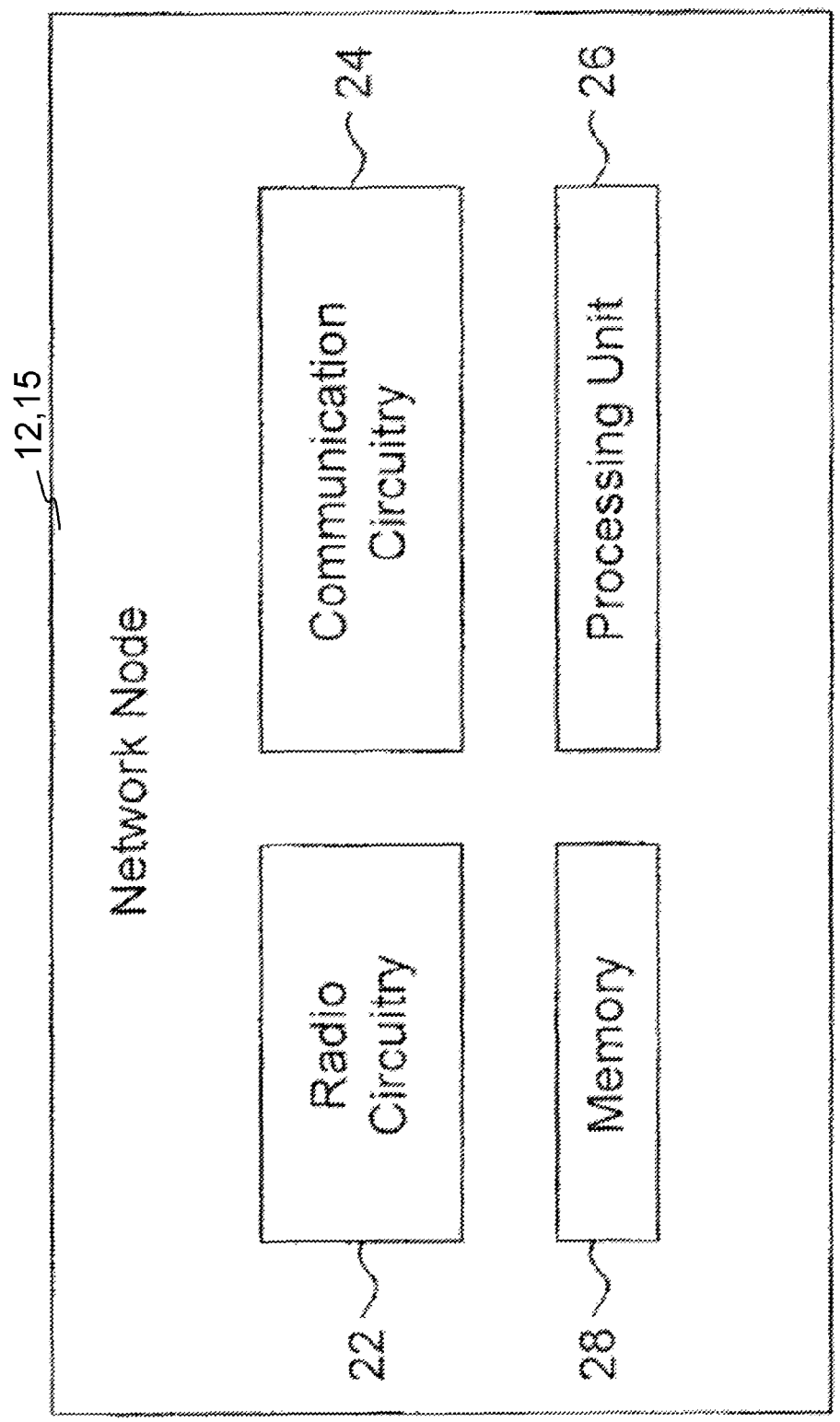
FIG. 10 is a block diagram depicting a network node according to embodiments herein.

FIG. 10 shows a non-limiting example function block diagram of a base station, e.g. macro and/or low power, such as the base station 12 or the second base station 13, that may be used to implement the technology described above. The base station 12 includes: a radio circuitry 22 to communicate with UEs and perhaps other nodes, e.g. relay nodes; a communication circuitry 24 to communicate with other radio network nodes and core network nodes; a memory 28 to store data information and computer program information; and one or more data processing units 26 for implementing the tasks and actions described above, e.g. using the programs and data stored in the memory 28. The radio circuitry 22 is configured to detect UL signals received from UEs so that received signal quality may be evaluated and reported if desired to another network node such as the radio network controller 12 for example. The radio circuitry 22 may also be configured to send power control commands to one or more UEs. The communication circuitry 24 may be configured to receive information such as power control information, SHO information, measurement information, etc from other base stations and other network nodes such as the radio network controller 15.

The technology may also be implemented in the serving base station 12 or the radio network controller 15 or the user equipment 10. The user equipment 10 includes similar function blocks as in FIG. 10. The radio network controller 15 includes similar functions blocks as in FIG. 10 but without radio circuitry.

Figure 11:
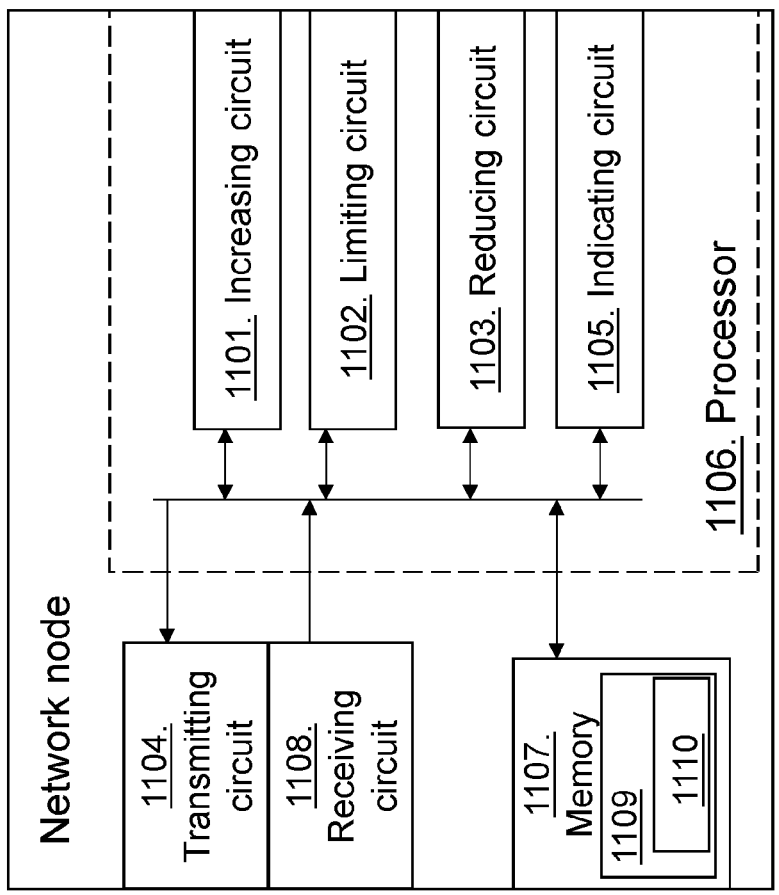
FIG. 11 is a block diagram depicting a network node according to embodiments herein.

FIG. 11 discloses a network node for managing transmit power of the user equipment 10 in the cellular network 1. The network node is configured to serve the user equipment 10. The network node being configured to perform the methods disclosed herein.

For example, the network node may comprise an increasing circuit 1101 configured to increase a power of a control channel of the user equipment 10. The network node may comprise a limiting circuit 1102 configured to limit a power increase of a data channel to a level by reducing a power of a serving grant of the user equipment 10 an amount, which amount corresponds to the increased power of the control channel. The limiting circuit 1102 may be configured to reduce the power of the serving grant by reducing a gain factor to be used for the data channel. The limiting circuit 1102 may further be configured to limit the power by maintaining the power of the data channel.

The network node may further comprise a reducing circuit 1103 configured to reduce a reference value of the data channel for maintaining a transport block size of the data channel, which reference value determines a mapping from the serving grant to the transport block size. The reference value is amplitude reference value of an E-DPDCH. The reducing circuit 1103 may be configured to use a negative DeltaHARQ value to reduce the reference value.

The network node may further comprise a transmitting circuit 1104 configured to transmit the reference value to the user equipment 10.

The network node may further comprise a indicating circuit 1105 configured to indicate, to the user equipment 10, a set of reference values to use out of several sets of reference values or an offset of a reference value to use.

The network node may be configured to manage the transmit power when at least one of the following occurs: entering soft handover; entering soft handover between network nodes of different transmit power capability; a quality of the control channel goes below a threshold value; a quality of the data channel is below a target; receiving, from the user equipment 10, an indication of too many retransmissions from a base station serving the user equipment 10; and receiving uplink signal quality of a certain level.

The network node may be configured to increase the power of the control channel by increasing a SIR target at the radio network controller 15.

The embodiments herein for managing transmit power of the user equipment 10 may be implemented through one or more processors 1106 in the network node depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the network node. One such carrier may be in the form of a CD ROM disc. It is however feasible with other data carriers such as a memory stick. The computer program code may furthermore be provided as pure program code on a server and downloaded to the network node.

The network node further comprises a memory 1107. The memory comprises one or more units to be used to store data on, such as quality thresholds, power settings, reference values, offsets, serving grants, gain factors, SIR targets, applications to perform the methods disclosed herein when being executed, and similar. The network node further comprises a receiving circuit 1108 configured to receive data from the user equipment 10 or another network node.

Figure 12:
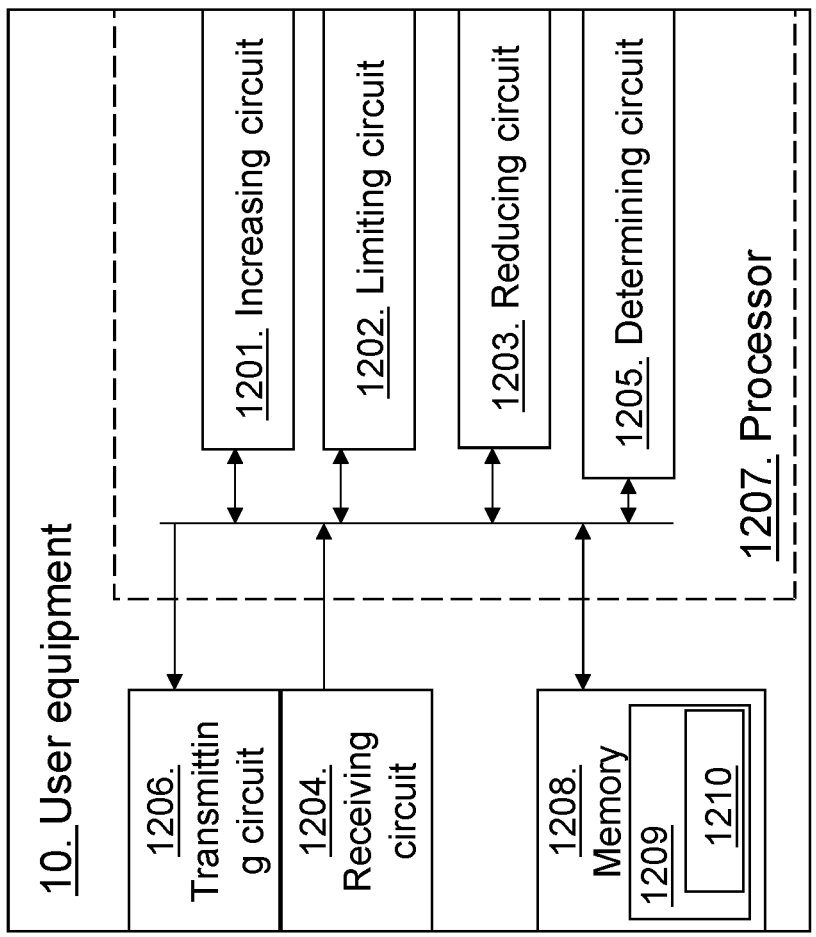
FIG. 12 is a block diagram depicting a user equipment according to embodiments herein.

FIG. 12 discloses a user equipment 10 for managing transmit power of the user equipment 10 in the cellular network 1. The cellular network comprises a network node serving the user equipment 10. The user equipment 10 is configured to perform the method disclosed herein.

For example, the user equipment 10 may comprise an increasing circuit 1201 configured to increase a power of a control channel of the user equipment 10.

The user equipment 10 may further comprise a limiting circuit 1202 configured to limit a power increase of a data channel to a level by reducing a power of a serving grant of the user equipment 10 an amount. The amount corresponds to the increased power of the control channel. The user equipment 10 may reduce the power by using a reduced gain factor for the data channel.

The user equipment 10 may also comprise a reducing circuit 1203 configured to reduce a reference value of the data channel for maintaining a transport block size of the data channel. The reference value determines a mapping from the serving grant to the transport block size.

The user equipment 10 may comprise a receiving circuit 1204 configured to receive the reduced reference value from the network node. The network node may be configured to use the reduced reference value resulting in the increasing of the power of the control channel and the limiting of the power of the data channel.

The user equipment 10 may further comprise a determining circuit 1205 configured to determine that the base station 12 serving the user equipment 10 performs too many retransmissions.

The user equipment 10 may also comprise a transmitting circuit 1206 that in response to determining that the base station 12 performs too many retransmissions, be configured to transmit information, to the radio network controller 15, that a link towards the base station 12 is poor.

The receiving circuit 1204 may be configured to receive, from the network node, a serving grant, a reference value, and/or an order to reduce the transmit power of the control channel. The limiting circuit 1202 may be configured to use the received serving grant value to reduce the serving grant, and the reducing circuit 1203 may be configured to use the received reference value to reduce the reference value.

The reducing circuit 1203 may further be configured to use a negative DeltaHARQ value towards the network node when reducing the reference value.

The user equipment 10 may be configured to comprise several sets of reference values, and the receiving circuit 1204 may be configured to receive, from the network node, an indication indicating which set out of the several sets to use.

The embodiments herein for managing transmit power of the user equipment 10 may be implemented through one or more processors 1207 in the user equipment 10 depicted in FIG. 12, together with computer program code for performing the functions and/or method actions of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The user equipment 10 further comprises a memory 1208. The memory 1208 comprises one or more units to be used to store data on, such as quality thresholds, power settings, reference values, offsets, serving grants, gain factors, SIR targets, applications to perform the methods disclosed herein when being executed, and similar.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

The technology described solves problems associated with DL/UL communication involving several links, where some of the links are weak, by boosting the transmit power on one or more control channels while maintaining data channel power. The technology described above may be combined with other solutions, e.g. boosting of other channels, and may also be applied to network other than heterogeneous networks.

The description herein sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Thus, the methods according to the embodiments described herein for the network node and the user equipment 10 are respectively implemented by means of a computer program product, denoted 1110 in FIGS. 11 and 1210 in FIG. 12, comprising instructions, i.e., software code portions, which, when executed on at least one processor, cause the at least one processor to carry out the actions described herein, as performed by the network node or the user equipment 10. The computer program product 1110, 1210 may be stored on a computer-readable storage medium denoted as 1109, 1209 in respective FIG. 11, 12. The computer-readable storage medium 1109,1209, having stored thereon the computer program product 1110, 1210, may comprise the instructions which, when executed on at least one processor, cause the at least one processor to carry out the actions described herein, as performed by the network node or the user equipment 10. In some embodiments, the computer-readable storage medium may be a non-transitory computer-readable storage medium.

Although the description is given for user equipment (UE), it should be understood by the skilled in the art that "UE" is a non-limiting term comprising any wireless device or node equipped with a radio interface allowing for at least one of: transmitting signals in the UL and receiving and/or measuring signals in the DL. Some examples of user equipment in its general sense are a Personal Digital Assistant (PDA), laptop, mobile, sensor, fixed relay, mobile relay, mobile tablet, and a radio network node (e.g. a Location Measuring Unit (LMU) or a femto base station or a small base station using the terminal technology). A user equipment may be and preferably is capable of operating or at least performing measurements in one or more frequencies, carrier frequencies, component carriers or frequency bands. A user equipment may operate in a single-RAT, a multi-RAT, or a multi-standard mode.

A cell is associated with a base station, where a base station comprises in a general sense any node transmitting radio signals in the downlink (DL) and/or receiving radio signals in the uplink (UL). Some example base stations are as stated above eNodeB, eNB, NodeB, macro/micro/pico/femto radio base station, home eNodeB, relay, repeater, sensor, transmitting-only radio nodes or receiving-only radio nodes. A base station may operate and/or perform measurements in one or more frequencies, carrier frequencies or frequency bands and may be capable of carrier aggregation. A base station may also use a single-radio access technology (RAT), a multi RAT, or operate using a multi standard node, e.g. using the same or different base band modules for different RATs.

The signaling described herein is either via direct links or logical links, e.g. via higher layer protocols and/or via one or more network nodes. For example, signaling from a coordinating node may pass another network node, e.g. a radio node.

Figure 13:
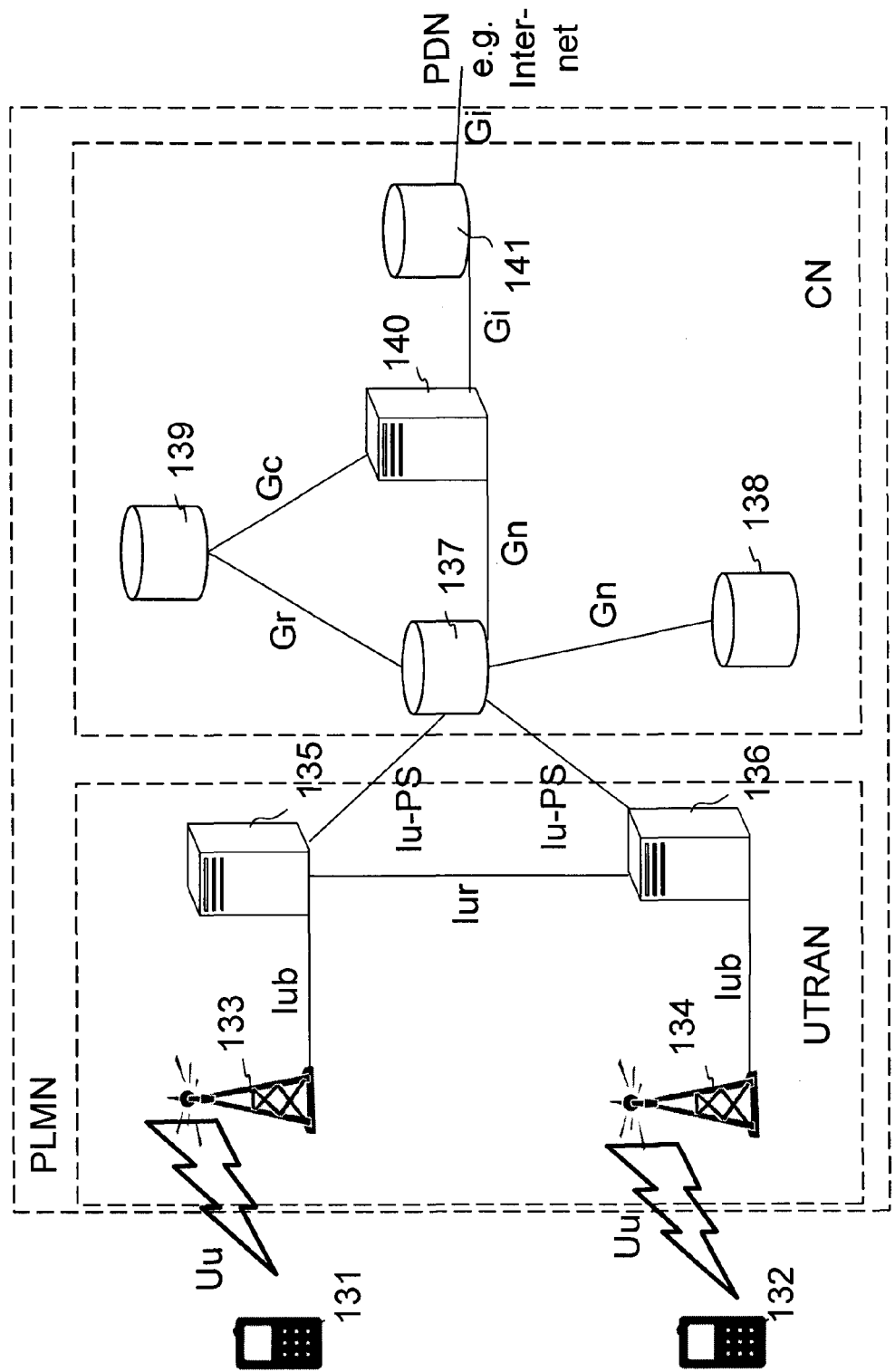
FIG. 13 is a schematic overview depicting a cellular network.

Although the following description uses WCDMA UMTS as an example of a cellular network or cellular system, the example embodiments are not limited to WCDMA, but may apply to other radio access networks (RAN), single-RAT or multi-RAT. FIG. 13 shows a diagram of an example WCDMA UMTS system. The nodes and interfaces are well known to this skilled in the art. The WCDMA UMTS system comprises base stations (NodeB) 131, 132, each serving a user equipment 133,134 over a Uu interface. The base stations 131,132 are controlled by a radio network controller (RNC) 135,136 to which they are communicating over a lub interface. The RNCs 135,136 are communicating over an Iur interface. The RNCs 135,136 are connected to the CN over Iu-PS interface to a Serving GPRS support node (SGSN) 137. The SGSN 137 may be connected to another SGSN 138 over a Gn interface. The SGNS 137 is further connected to a Gateway GPRS support node (GGSN) 139 over a Gn interface. The SGSN is connected to a Home Location Register (HLR) 140 over a Gr interface and the GGSN 139 is connected to the HLR 140 over a Gc interface. The GGSN is connected to a Broadcast-Multicast Service Center (BM-SC) 141 over a Gi interface. The BM-SC 141 is connected to a Packet Data Network (PDN) e.g. the internet over a Gi interface. The RAN and CN is comprised in a Public Land Mobile Network (PLMN) and the RAN is called UTRAN. The network node may be exemplified in any of the NodeBs 133,134 or RNCs 135,136.

Embodiments described herein may be considered as independent embodiments or may be considered in any combination with each other to describe non-limiting examples. In the non-limiting examples above, an eNB is used as the example base station, a macro eNB is used as the example of, and the term includes, any type of larger base station serving a larger cell, referred to as a macro cell, and a pico eNB is used as an example of, and the term includes, any type of smaller, low power base station serving a smaller cell, referred to as a pico cell.

Although the description above comprises many specifics, they should not be construed as limiting but merely as providing illustrations of some presently preferred embodiments. The principles of the technology described may be applied to other radio access technologies. Indeed, the technology fully encompasses other embodiments which may become apparent to those skilled in the art. Reference to an element in the singular is not intended to mean "one and only one" unless explicitly so stated, but rather "one or more". None of the above description should be read as implying that any particular element, step, range, or function is essential. All structural and functional equivalents to the elements of the above-described preferred embodiment that are known to those of ordinary skill in the art are expressly incorporated herein by reference.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method in a network node for managing transmit power of a user equipment in a cellular network; wherein the network node is comprised in the cellular network and serves the user equipment; the method comprising:
   increasing a power of a control channel of the user equipment;
   limiting a power increase of a data channel to a level by reducing a power of a serving grant of the user equipment by an amount, which amount corresponds to the increased power of the control channel; and
   reducing a reference value of the data channel for maintaining a transport block size of the data channel, which reference value determines mapping from the serving grant to the transport block size.

2. A method according to claim 1, wherein the reducing comprises to transmit the reference value to the user equipment.

3. A method according to claim 1, wherein the reducing comprises to indicate, to the user equipment, a set of reference values to use out of several sets of reference values, or an offset of a reference value to use.

4. A method according to claim 1, wherein the method is performed when at least one of the following occurs: entering soft handover; entering soft handover between network nodes of different transmit power capability; a quality of the control channel goes below a threshold value; a quality of the data channel is below a target; receiving, from the user equipment, an indication of too many retransmissions from a base station serving the user equipment; and receiving uplink signal quality of a certain level.

5. A method according to claim 1, wherein the increasing the power of the control channel comprises to increase a Signal to Interference Ratio, SIR, target at a radio network controller.

6. A method according to claim 1, wherein the reducing the power of the serving grant comprises to reduce a gain factor to be used for the data channel.

7. The method according to claim 1, wherein the reference value is amplitude reference value of an Enhanced Dedicated Channel Dedicated Physical Data Channel, E-DPDCH.

8. The method according to claim 1, wherein a negative DeltaHARQ value is used to reduce the reference value.

9. A non-transitory computer storage medium having a computer program product stored thereon, the computer program product comprising instructions which, when executed on at least one processor, cause the at least one processor to carry out the method according to claim 1.

10. A method in a user equipment for managing transmit power of the user equipment in a cellular network, which cellular network comprises a network node serving the user equipment; the method comprising
   increasing a power of a control channel of the user equipment;
   limiting a power increase of a data channel to a level by reducing a power of a serving grant of the user equipment by an amount, which amount corresponds to the increased power of the control channel; and
   reducing a reference value of the data channel for maintaining a transport block size of the data channel, which reference value determines a mapping from the serving grant to the transport block size.

11. A method according to claim 10, wherein the reducing comprises to receive the reduced reference value from the network node, and to use the received reference value resulting in the increasing of the power of the control channel and the limiting of the power of the data channel.

12. A method according to claim 10, further comprising
   determining that a base station serving the user equipment performs too many retransmissions; and
   transmitting information, to a radio network controller, that a link towards the base station is poor based on the determination.

13. A method according claim 10, wherein a serving grant value, a reference value, and/or an order to reduce the transmit power of the control channel is received from the network node; and the received serving grant value is used to reduce the serving grant and the received reference value is used to reduce the reference value.

14. A method according to claim 10, wherein reducing the reference value comprises to use a negative DeltaHARQ value towards the network node.

15. A method according to claim 10, wherein the user equipment comprises several sets of reference values, and an indication indicating which set out of the several sets to use is received from the network node.

16. A network node for managing transmit power of a user equipment in a cellular network; wherein the network node is configured to serve the user equipment; the network node being configured:
   to increase a power of a control channel of the user equipment;
   to limit a power increase of a data channel to a level by reducing a power of a serving grant of the user equipment by an amount, which amount corresponds to the increased power of the control channel; and
   to reduce a reference value of the data channel for maintaining a transport block size of the data channel, which reference value determines a mapping from the serving grant to the transport block size.

17. A network node according to claim 16, further being configured to
   transmit the reference value to the user equipment.

18. A network node according to claim 16, further being configured to
   indicate, to the user equipment, a set of reference values to use out of several sets of reference values or an offset of a reference value to use.

19. A network node according to claim 18, being configured to manage the transmit power when at least one of the following occurs: entering soft handover; entering soft handover between network nodes of different transmit power capability; a quality of the control channel goes below a threshold value; a quality of the data channel is below a target; receiving, from the user equipment, an indication of too many retransmissions from a base station serving the user equipment; and receiving uplink signal quality of a certain level.

20. A network node according to claim 18, being configured to increase the power of the control channel by increasing a Signal to Interference Ratio, SIR, target at a radio network controller.

21. A network node according to claim 18, being configured to reduce the power of the serving grant by reducing a gain factor to be used for the data channel.

22. A network node according to claim 18, wherein the reference value is amplitude reference value of an Enhanced Dedicated Channel Dedicated Physical Data Channel, E-DP-DCH.

23. A network node according to claim 18, being configured to use a negative DeltaHARQ value to reduce the reference value.

24. A user equipment for managing transmit power of the user equipment in a cellular network, which cellular network comprises a network node serving the user equipment; wherein the user equipment is configured to:
   increase a power of a control channel of the user equipment;
   limit a power increase of a data channel to a level by reducing a power of a serving grant of the user equipment by an amount, which amount corresponds to the increased power of the control channel; and
   reduce a reference value of the data channel for maintaining a transport block size of the data channel, which reference value determines a mapping from the serving grant to the transport block size.

25. A user equipment according to claim 24, further being configured to
   receive the reduced reference value from the network node; and
   use the reduced reference value resulting in the increasing of the power of the control channel and the limiting of the power of the data channel.

26. A user equipment according to claim 24, further being configured to:
   determine that a base station serving the user equipment performs too many retransmissions; and, in response to that,
   transmit information, to a radio network controller, that a link towards the base station is poor.

27. A user equipment according to claim 24, further being configured to:
   receive, from the network node, a serving grant value, a reference value, and/or an order to reduce the transmit power of the control channel; and using the received serving grant value to reduce the serving grant and using the received reference value to reduce the reference value.

28. A user equipment according to claim 24, being configured to use a negative DeltaHARQ value towards the network node when reducing the reference value.

29. A user equipment according to claim 24, being configured to comprise several sets of reference values, and further being configured to receive, from the network node, an indication indicating which set out of the several sets to use.

* * * * *